United States Patent [19]

Pelzer

[11] Patent Number: 4,894,275
[45] Date of Patent: Jan. 16, 1990

[54] FLOOR MAT/FOOT PAD FOR AUTOMOBILES

[76] Inventor: Helmut Pelzer, Neue Strasse 5, D-5804 Herdecke-Ende, Fed. Rep. of Germany

[21] Appl. No.: 247,908

[22] Filed: Sep. 22, 1988

[30] Foreign Application Priority Data

Oct. 2, 1987 [DE] Fed. Rep. of Germany ....... 3733286
Oct. 2, 1987 [DE] Fed. Rep. of Germany ....... 3733285

[51] Int. Cl.$^4$ .............................. B32B 3/02; B32B 3/30
[52] U.S. Cl. .................................... 428/166; 428/173; 428/192; 428/343
[58] Field of Search ................. 428/80, 173, 343, 198, 428/201, 166, 178

[56] References Cited

U.S. PATENT DOCUMENTS 4,618,520 10/1986 Holmberg ........................... 428/173
4,769,271 9/1988 Sekimoto ........................... 428/173

FOREIGN PATENT DOCUMENTS 0105189 8/1979 Japan .................................... 428/173

Primary Examiner—George F. Lesmes
Assistant Examiner—J. Davis
Attorney, Agent, or Firm—Ralf H. Siegemund

[57] ABSTRACT

Floor mats or foot pads for automobiles are preferably made of foam each having a back and underside being provided with a plurality of pocketlike indents; prior to installation these pockets are filled with a viscous adhesive, a bonding agent, a boom attenuating material or the like; the pockets are provided with undercut-overhung portions such as the pad hangs vertically for storage the viscous material will not flow out of these pockets.

2 Claims, 1 Drawing Sheet

FLOOR MAT/FOOT PAD FOR AUTOMOBILES

BACKGROUND OF THE INVENTION

The present invention relates to a foot pad, floor mat, cover or the like for automobiles particularly including a sound absorbing layer or layers with or without foam material basically constructed as a spring-resilient mass system whereby e.g. the back or underside of that mat is fastened in or de-droning material fastened to the floor or the like of the vehicle.

In the past floor covers, mats and pads of this kind were moved from the manufacturer to the user, in effect in a hanging disposition. The user removed these pads from suitable holders or racks and installed them on the floor of an automobile. In order to position the cover pads or floor mats properly it is customary to apply the bonding agent, adhesive or other material to the back of what will become the underside of the cover, mat or pad. Alternatively this material was directly applied to the vehicle floor whereupon the mat or pad is caused to adhere firmly to the vehicle bottom. This kind of approach is relatively expensive in terms of assembly because whoever has to install the mat, cover or pad must in some form first apply the adhesive or bonding agent.

DESCRIPTION OF THE INVENTION

It is an object of the present invention to provide a new and improved floor, mat, cover or covering pad for automobiles in which the additional application of a bonding agent, an adhesive material or a de-droning i.e. boom attenuating material, is avoided.

It is a feature of the invention to apply a bonding agent, adhesive and/or de-droning material to the mat or pad at a time of its manufacture, prior to (i.e. well ahead of) any installation. There may of course be a transport step interposed between the application of this bonding agent, adhesive agent, boom (sound) attenuating material or the like and the final installation.

In accordance with the preferred embodiment of the present invention, it is suggested to provide the back or rear portion or underside of the pad or mat with the plurality of pocketlike indents which are filled with a viscous material such as a bonding agent etc. whereby specifically the pockets are constructed as small receiving chambers, each with an undercut portion, all pockets being oriented in the same fashion, so that in the case of a vertical transport disposition of the mat, the viscous material is safely retained in the pockets by the undercuts.

In accordance with a further feature of the invention the back or rear side or lower side of the pad is more or less covered with these pockets, they can of course be filled at the time of manufacture with the viscous adhesion and bonding agent. Owing to the undercut-overhung portion, the material will remain in these pockets even when the pad is suspended to hang in a vertical position; the undercut-overhung portion prevents any flowing out.

As soon as the pad is to be installed in the foot area of the car it is reoriented from the vertical position to a horizontal with the pockets all facing down upon being taken from the rack, hanger or the like the viscous material may begin to flow out of the pockets, but at that point in time the pad will be ready to cover the floor so that the flowing out of material actually renders it directly available for the bonding process, it is only necessary to tap the foot pad down.

It can thus be seen that it is a principle of the invention to provide the rear or underside of the mat or pad, the well distributed multiple reservoirs so that the de-droning and adhesive bonding agent are retained during transport, but the pockets will yield the bonding agent as the pad is put down.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
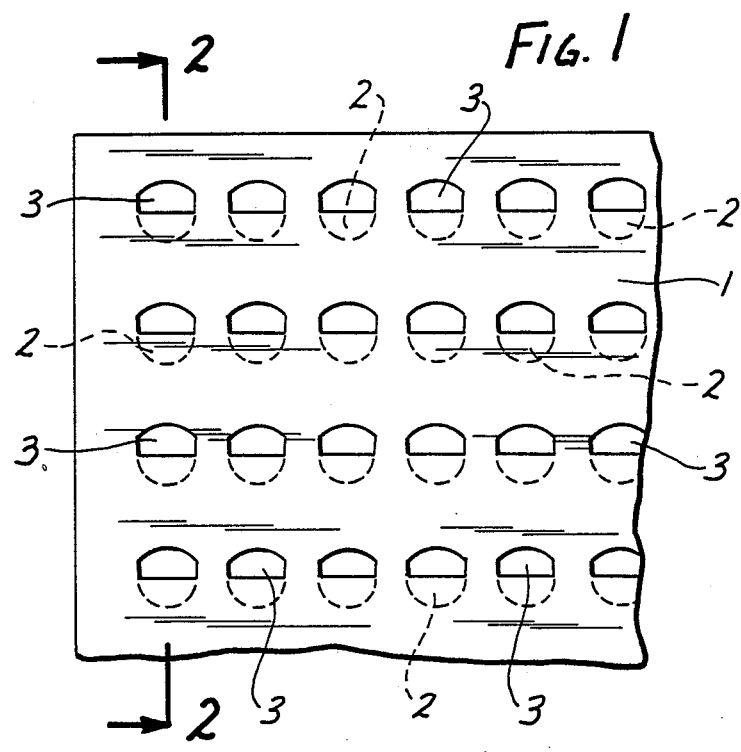
FIG. 1 is a rear view of a pad in accordance with the preferred embodiment of the present invention for practicing the best mode thereof.
Figure 2:
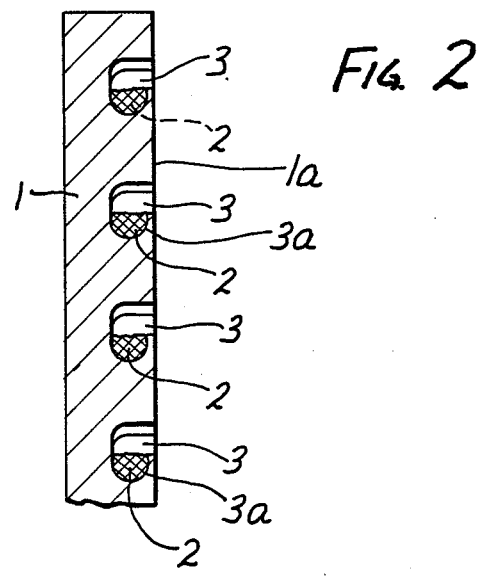
FIG. 2 is a section view indicated by II—II in FIG. 1.

Proceeding to the detailed description of the drawings, a floor mat or foot cover or floor lining pad 1 is shown generally to be of conventional construction and configuration as far as materials and the overall contour is concerned; it is to be adapted easily to the floor area of an automobile. It may be a simple rectangular mat or pad whatever is practical in the circumstances including dimensions and car design.

Preferably, one will use foam material for this mat or pad 1 simply because foam material has certain advantages in its use as far as sound attenuation and cushioning generally and the like is concerned. On the other hand, the invention can indeed be practiced with greatest advantage when the base is made of foam material.

For fastening such mats or pads to the sheet metal of the vehicle constituting the floor the mat or pad has to be covered with a certain amount of bonding, adhesion or de-droning material. Alternatively in the past the floor was so covered. This coverage must be carried out with a fairly uniform kind of distribution, clearly covering the entire rear area so the mat will adhere throughout.

For this procedure of fastening and to permit avoidance of residual or supplemental application of adhesion material, the entire rear surface of the pad 1 is provided with pocketlike indents 3. Each of these pockets 3 has a overhung-undercut portion 3a so that the mat or pad can be hung vertically. The pocket will be 90 degrees shifted as far as the rear surface 1a of the pad is concerned so that the particular bonding agent 2 fills the lower part of these pockets behind the undercut pocket wall 3a.

Once the pad is taken from the vertical suspension and put flat down it is in effect tilted by 90 degrees so that the underside 1a now faces down and the material 2 is permitted to flow out of the pocket 3. Obviously, if the material is very viscous the flow is so slow so that it does not make much difference when the pad is being manipulated in a horizontal position. It may not immediately touch the floor of the automobile but soon it will.

It can easily be seen that depending on the regularity of the distribution of the pockets there will be a regular flow of material out of these pockets in terms of regularly spaced bonding material and once the mat or pad is placed down with the surface 1a abutting the metal or principal bottom or floor of the vehicle the bonding material will be more or less evenly distributed.

The invention is not limited to the embodiments described above but all changes and modifications thereof, not constituting departures from the spirit and scope of the invention, are intended to be included.

I claim:

1. In a floor mat for automobiles made of a sound absorbing material having a back and underside, the improvement comprising:

a plurality of open pocketlike indents in the underside of said pad containing a viscous adhesive agent, the pockets having been filled with the viscous adhesive agent prior to installation of the floor mat in an automobile; and the pockets being provided with undercut and overhung portions such that, as the pad hangs vertically for storage, the viscous material will not flow out of these open pockets.

2. Floor mat as in claim 1, the viscous material after flowing out will form a supplemental sound attenuating layer.

* * * * *